United States Patent [19]
Readey

[11] Patent Number: 5,183,785
[45] Date of Patent: Feb. 2, 1993

[54] ALUMINUM BORATE CERAMICS AND PROCESS FOR PRODUCING SAME

[75] Inventor: Michael J. Readey, Denver, Colo.

[73] Assignee: Coors Porcelain Company, Golden, Colo.

[21] Appl. No.: 545,864

[22] Filed: Jun. 29, 1990

[51] Int. Cl.$^5$ .................... C04B 35/10; C04B 35/02; C04B 35/18; C04B 35/58

[52] U.S. Cl. ...................... 501/127; 501/94; 501/96; 501/153; 423/276; 423/278; 423/289; 423/600

[58] Field of Search ............ 501/94, 95, 96, 105, 501/119, 127, 153; 502/202; 423/276, 278, 289, 600

[56] References Cited

U.S. PATENT DOCUMENTS

| | | | |
|---|---|---|---|
| 3,080,242 | 3/1963 | Berry | 106/65 |
| 3,350,166 | 10/1967 | Alley et al. | 23/59 |
| 3,795,524 | 3/1974 | Sowman | 106/65 |
| 3,856,702 | 12/1974 | McArthur | 252/432 |
| 3,856,705 | 12/1974 | McArthur | 252/432 |
| 4,226,629 | 10/1980 | Tabuchi et al. | 106/65 |
| 4,645,753 | 2/1987 | Zletz et al. | 502/202 |
| 4,774,210 | 9/1988 | Ray | 501/127 |
| 4,789,422 | 12/1988 | Misra | 156/623 |
| 4,804,642 | 2/1989 | Ray | 501/87 |
| 4,804,646 | 2/1989 | Ray | 501/105 |

OTHER PUBLICATIONS

Kingery et al, "Introduction to Ceramics", Second Edition, John Wiley & Sons, Inc., 1976, p. 469.

Primary Examiner—Mark L. Bell
Assistant Examiner—Michael Marcheschi
Attorney, Agent, or Firm—Sheridan Ross & McIntosh

[57] ABSTRACT

The present invention provides an aluminum borate ceramic having a high porosity and a tightly controlled pore size distribution, while maintaining good mechanical strength. The ceramic body can be formed by decomposing boric acid-stabilized aluminum acetate to form an aluminum borate powder, and sintering the powder to form a ceramic body.

11 Claims, No Drawings

ALUMINUM BORATE CERAMICS AND PROCESS FOR PRODUCING SAME

FIELD OF THE INVENTION

This invention relates to aluminum borate ceramics and a process for producing aluminum borate ceramics. More particularly, this invention relates to a novel aluminum borate ceramic having a high degree of porosity and a narrow pore size distribution. The aluminum borate ceramic is particularly useful as a filtering medium.

BACKGROUND OF THE INVENTION

The area of filtration and its tremendous market potential has led to the development of several new types of porous materials with precisely controlled properties. These porous materials can act as filters in such varied applications as hot gases, molten metal, and waste water treatment.

Filtration applications are becoming more demanding on the filter's material requirements. For example, the food industry uses acidic materials during food processing which require corrosive-resistant filters. Molten metal filters must be able to withstand high temperatures. For applications in such severe environments, ceramics are becoming increasingly popular as filter materials, due to their exceptional high temperature stability, and superior resistance to chemical attack. One material that has these desirable properties is aluminum borate ($Al_{18}B_4O_{33}$). However, aluminum borate has not heretofore been fabricated with the porosity characteristics necessary for applicability as a filter medium.

U.S. Pat. Nos. 3,856,702 and 3,856,705, both by McArthur, describe crystalline aluminum borate catalyst supports produced by pre-calcining shaped composites of alumina ($Al_2O_3$) and boria ($B_2O_3$) at temperatures between about 1250° F. and about 2600° F. (675° C. to 1425° C.). The alumina and boria powders are intimately mixed and formed into a desired shape prior to calcining. The resulting sintered body preferably has a porosity of about 0.2 ml/gm to 0.8 ml/gm.

U.S. Pat. No. 4,804,646 to Ray discloses a shaped aluminum borate product having a modulus of rupture of at least 45,000 psi (310 MPa) and a density of approximately 2.9 g/cm³. The product is formed by reacting alumina and boria at a temperature of at least 800° C., grinding the reaction product, pressing the resulting shaped form and sintering the shaped particulate at a temperature of from 800° C. to 1400° C. under a pressure of 2500 psi to 3500 psi.

U.S. Pat. No. 4,789,422 to Misra, discloses a process for producing aluminum borate fibers by reacting aluminum salt in a solution with aluminum borate and heating the gel to form aluminum borate fibers. The fibers have a length from about 20 to 200 micrometers and a diameter of from about 1 to 10 micrometers.

U.S. Pat. No. 3,795,524 to Sowman, discloses a process for producing aluminum borate and aluminum borosilicate articles using aqueous-based processes. It is disclosed that an especially useful raw material which can be used to prepare a precursor aqueous solution is basic aluminum acetate stabilized with boric acid. In this process, the dilute liquid is concentrated or "viscofied" in order to convert it to a viscous or syrupy fluid concentrate which will readily gel when the concentrate is formed into a shaped article and dehydrated. It is disclosed that transparent fibers 10 to 20 feet in length are formed.

It would be useful to have a process for forming aluminum borate fibers and aluminum borate ceramics which is simplified and economically advantageous. It would further be useful to have a process for producing aluminum borate ceramics with a high degree of porosity and a tightly controlled pore size distribution.

SUMMARY OF THE INVENTION

The present invention provides a process for producing an aluminum borate ceramic body by calcining boric acid-stabilized aluminum acetate powder, and thereafter shaping the calcined powder into a green body and sintering the green body.

The invention further provides a ceramic body that includes aluminum borate, having a tightly controlled pore size distribution, a high porosity and high strength.

In one embodiment of the present invention, the ceramic body has a porosity of from about 10 percent to about 60 percent, with at least about 95 percent of all pores between about 0.1 micrometers and about 10 micrometers.

In another embodiment of the present invention, the ceramic body has a flexural strength of at least about 30 MPa.

The invention further provides a process wherein an aluminum acetate powder is calcined to form aluminum borate powder. In one embodiment, the aluminum borate powder includes needle-like particles 2 to 100 micrometers in length.

The present invention also provides a ceramic filter comprising aluminum borate, where the aluminum borate has a porosity of at least about 10 percent with an average pore size from about 2 micrometers to about 3 micrometers.

DETAILED DESCRIPTION OF THE INVENTION

According to the present invention, an aluminum borate powder is produced by calcining aluminum acetate powder stabilized with boric acid. The calcined powder can then be shaped into a green body and sintered to form a cohesive aluminum borate ceramic.

As used herein, the term "aluminum borate" refers generally to the composition $Al_{18}B_4O_{33}$. However, it is to be expressly understood that nominal variations in the stoichiometry can exist without falling outside the scope of the invention. For example, phase equilibria studies indicate that a residual phase of $Al_4B_2O_9$ may also form.

The decomposition of aluminum acetate in an oxygen-containing atmosphere is believed to occur by the following reaction:

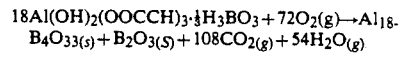

Aluminum acetate is particularly useful for the purposes of the present invention since aluminum acetate undergoes a large change in volume during decomposition, giving rise to desirable porosity characteristics.

High purity aluminum acetate powder can be utilized in the present invention. However, the cost of aluminum acetate powder is high, and it is believed that high purity powder has no particular advantage to the present invention. Therefore, lower purity powder can be utilized leading to a reduction in raw material costs. For example, a powder having a purity of 90 weight percent can be utilized. Preferably, the powder has a fine grain size, with generally spherical particles, approximately 50 to 100 micrometers in diameter. The particle size of the aluminum acetate can be adjusted by, for example, ball milling the powder.

Forming the aluminum acetate powder into a green body prior to decomposition can result in considerable cracking due to the large volume change associated with the decomposition. It is therefore desirable to decompose the aluminum acetate powder prior to the forming of a green body. To acheive decomposition, the aluminum acetate powder is calcined at a temperature and time sufficient to convert at least a portion of the aluminum acetate to aluminum borate. Experimentation has shown that temperatures above 500° C. are most beneficial in this regard. Preferably, the powder is calcined at between about 800° C. and 1600° C., more preferably between about 1000° C. and about 1200° C. However, higher calcining temperatures can be utilized to achieve varying results in the final sintered body, as is discussed in more detail hereinbelow.

The calcination time can vary with the calcination temperature. Preferably, the powder is calcined for from about to about 5 hours, more preferably from about 1 to about 2 hours. However, the preferred calcination times can vary with temperature, amount of powder being calcined and degree of reaction desired. Extremely long calcination times are undesirable for economic reasons.

To facilitate the formation of aluminum borate in the calcined powder, it is preferable to calcine the aluminum acetate in the presence of oxygen. This can be accomplished, for example, by calcining in air (approximately 21% oxygen) or by providing a controlled oxygen atmosphere.

Preferably at least about 80 weight percent, more preferably at least about 95 weight percent, of the aluminum acetate powder will convert to aluminum borate. Typically, from about 5 to about 20 weight percent of $B_2O_3$ will remain in the calcined powder.

While not wishing to be bound by any theory, it is believed that when the aluminum acetate powders are calcined in the above-described manner the spherical particles become smaller, with little change in morphology. These calcined powders will have a particle substructure of needle-like grains developing within the larger agglomerates. These needles have been identified as the aluminum borate phase $Al_{18}B_4O_{33}$ by electron dispersive spectrometry (EDS). The average size of the needle-like particles generally increases with increasing calcining temperatures.

Typically, the needles have a length between about 2 micrometers and about 100 micrometers and a diameter between about 0.2 micrometers and about 10 micrometers, when the powder is calcined at about 1500° C. for about 1 hour.

In one embodiment of the present invention, the calcined powder is milled to reduce the particle size. Since the large, spherical particle morphology is retained during decomposition, it can be advantageous to reduce the particle size. For example, milling the particles breaks up the agglomerates, resulting in a more uniform and homogeneous microstructure consisting of the needle-shaped aluminum borate particles The powders can be milled in any way known to those skilled in the art. Preferably the powder is dry milled in a high alumina mill with high purity alumina media for about 24 hours.

After calcination, the powder is preferably formed into a green body. The green body can be formed by any method known to those skilled in the art. For example, the green body can be dry pressed in a uniaxial dry press or can be pressed isostatically. Further, organics and additives can be added to the powder composition to form a clay-like body which can be extruded or otherwise formed. Also, organics and other additives can be added to the powder to form a slurry which can subsequently be slip cast into a desired configuration.

After formation of the green body, the green body can be sintered to form a sintered body of aluminum borate. The green body is sintered at a temperature sufficient to form a unitary sintered ceramic body. Preferably, the green body is sintered at between about 1300° C. and about 1800° C., more preferably between about 1500° C. and about 1700° C. Although the sintering time is not deemed critical to the present invention, it is preferable that the green body be sintered for from about 1 to about 5 hours, more preferably from about 1 to about 2 hours. Typically, the body is sintered in an ambient atmosphere of air, however, other gases and pressure sintering techniques will be useful for the present invention.

The resulting sintered aluminum borate ceramic has a porosity of between about 10 percent and about 60 percent, preferably between about 40 and about 60 percent, most preferably between about 45 and about 55 percent. The density of the sintered aluminum borate ceramic is between about 1.1 and about 2.4 g/cc, more preferably between about 1.1 and about 1.6 g/cc and most preferably between about 1.2 and about 1.5 g/cc. According to the present invention, the pore size distribution is strictly controlled. The average pore size can be controlled and is preferably between about 0.1 and about 10 micrometers, more preferably between about 0.5 and about 5 micrometers, most preferably between about 0.8 and about 2.5 micrometers. In one embodiment, the average pore diameter is about 2 micrometers, with 95% of the pores being between about 0.1 and about 10 micrometers.

The sintered ceramic bodies produced by the present invention have a relatively high strength. Preferably, the sintered body had a strength greater than about 30 MPa, more preferably greater than about 50 MPa, and most preferably greater than about 60 MPa.

The sintered ceramic bodies produced according to the present invention are particularly useful as filtering mediums for molten metal, the food industry, waste water filtration, and the like.

The sintered bodies can also have molten metal impregnated into the pores to form a cermet structure, useful in structural applications.

The whiskers produced by the calcination step of the present invention can be useful for strengthening materials, such as other ceramics, and they are particularly useful for this application due to the oxidation resistance of the aluminum borate.

EXAMPLES

High purity aluminum acetate powder was obtained from VWR Scientific. The powder was originally produced by E. M. Science (Division of EM Industries, Inc., Cherry Hill, N.J. 08034). The powder is an extremely fine, white powder with substantially all particles between about 50 and about 100 micrometers in diameter, and has a formula weight of approximately 140.6 grams/mole. The particles appeared to be hollow, similar to powder obtained by a spray-drying process. X-ray diffraction analysis indicated that the powder was substantially amorphous.

One 500 gram batch of aluminum acetate powder was calcined in air at 1000° C. for six hours and one 500 gram batch of aluminum acetate powder was calcined in air at 1500° C. for one hour. Since the large, spherical particle morphology was retained during decomposition, it was decided to mill the powder after calcination to reduce the particle size. The two batches of calcined powder were both dry milled for 24 hours in a high alumina mill with high purity alumina media.

Test disks approximately 25 mm in diameter and 5 mm in thickness were pressed from the milled powders in a hardened steel die at 70 MPa. Additionally, flexure bars measuring 6.35×3.18×64 mm were pressed at 70 MPa. No binders or lubricants were used.

The pressed samples of the calcined aluminum acetate were then split into three groups and sintered at 1500° C., 1600° C. and 1700° C. for one hour using a small MoSi₂ Lindberg furnace (model L-2). Since the powder had been previously decomposed, shrinkage cracks were no longer a problem, and a relatively rapid heat-up cycle of 150° C. per hour was used. After soaking for one hour, the furnace was turned off and allowed to cool naturally. Typical cool-down cycles were four to six hours from the soak temperature to room temperature.

Analysis of the samples included porosity and density measurements using Archimedes method (ASTM 373-72) and shrinkage determination from the green and sintered diameters of the test disks. The pore size distribution was determined by the mercury intrusion method. The maximum pore size was measured by ASTM E testing method. Strength (Modulus of Rupture) was determined by a standard 4 point-bend test using an outer span of 45 mm and an inner span of 12 mm, and a loading rate of 250 micrometers per minute.

The porosity, density, specific gravity and shrinkage data for the sintered aluminum borate disks are shown in Table 1. Structurally, the disks and bars did not experience the cracking problem encountered with firing disks of as-received powder. Further, the sintered bodies did not have a "powdery" or chalky texture, indicating that the particles were well-bonded.

TABLE 1

| Sample No. | Calcine Temperature °C. | Sintering Temperatur °C. | Porosity % | Specific Gravity | Density (g/cc) | Shrinkage % |
|---|---|---|---|---|---|---|
| 1 | 1000 | 1500 | 45.98 | 2.705 | 1.461 | −1.79 |
| 2 | 1000 | 1500 | 45.67 | 2.697 | 1.465 | −1.79 |
| 3 | 1000 | 1600 | 53.39 | 2.946 | 1.373 | −1.93 |
| 4 | 1000 | 1600 | 53.10 | 2.933 | 1.376 | −1.96 |
| 5 | 1000 | 1700 | 52.77 | 2.991 | 1.413 | −0.94 |
| 6 | 1500 | 1500 | 22.61 | 2.876 | 2.226 | 7.79 |
| 7 | 1500 | 1500 | 22.54 | 2.878 | 2.230 | 7.59 |
| 8 | 1500 | 1600 | 14.86 | 2.875 | 2.448 | 11.13 |
| 9 | 1500 | 1600 | 18.53 | 2.964 | 2.415 | 11.13 |
| 10 | 1500 | 1700 | 23.25 | 3.223 | 2.474 | 11.78 |

As Table 1 shows, the degree of porosity is quite high, between about 15 and about 55 percent, depending on the calcining and firing conditions. The density of the disks range between about 1.4 g/cc and 2.4 g/cc. The specific gravity ranged between about 2.7 and 3.2, consistent with a primarily $Al_{18}B_4O_{33}$-rich ceramic. The shrinkage for powder calcined at 1000° C. is substantially zero, or actually slightly less than zero, indicating the compacts are expanding. The powder calcined at 1500° C. shrinks a maximum of about 11 percent.

Pore size analysis by the mercury intrusion method on the samples calcined at 1000° C. for six hours indicated that the sample sintered at 1500° C. for one hour had an average pore size of about 2.5 micrometers, the sample sintered at 1600° C. for one hour had an average pore size of about 2.5 micrometers and the sample sintered at 1700° C. for one hour had an average pore size of about 3 micrometers. The samples calcined at 1500° C. for one hour had much smaller pore diameters, typically around 0.7 micrometers. In all cases, the distribution of pore sizes was very narrow.

The maximum pore size data from the bubble test are given in Table 2. The maximum pore sizes for the powder calcined at 1000° C. are from about 2 to about 3 micrometers, consistent with the mercury intrusion data, and reflect the uniform nature of the pore size distribution. The powder calcined at 1500° C. resulted in compacts that were too dense for the bubble test method.

TABLE 2

| Sample No. | Calcine Temperature (°C.) | Sinter Temperature (°C.) | Pressure (psi) | Maximum Pore Size (micrometers) |
|---|---|---|---|---|
| 11 | 1000 | 1500 | 22 | 1.9 |
| 12 | 1000 | 1500 | 18 | 2.3 |
| 13 | 1000 | 1600 | 15 | 2.8 |
| 14 | 1000 | 1600 | 13 | 3.2 |
| 15 | 1000 | 1700 | 13 | 3.2 |
| 16 | 1000 | 1700 | 12 | 3.4 |
| 17 | 1500 | 1500 | NA | NA |
| 18 | 1500 | 1500 | NA | NA |
| 19 | 1500 | 1600 | NA | NA |
| 20 | 1500 | 1600 | NA | NA |
| 21 | 1500 | 1700 | NA | NA |
| 22 | 1500 | 1700 | NA | NA |

The strength of the porous ceramics are shown in Table 3. The maximum strength for the powder calcined at 1000° C. occurred when the pressed compact was sintered at 1500° C.

TABLE 3

| Sample No. | Calcine Temperature (°C.) | Sinter Temperature (°C.) | Module of Rupture (MPa) | Standard Deviation (MPa) |
|---|---|---|---|---|
| 23 | 1000 | 1500 | 55.2 | 1.72 |
| 24 | 1000 | 1600 | 37.3 | 2.62 |
| 25 | 1000 | 1700 | 33.4 | 8.2 |
| 26 | 1500 | 1500 | 62.0 | 5.10 |
| 27 | 1500 | 1600 | 76.4 | 9.23 |
| 28 | 1500 | 1700 | 60.4 | 15.0 |

While various embodiments of the present invention have been described in detail, it is apparent that modifications and adaptations of those embodiments will occur to those skilled in the art. However, it is to be expressly understood that such modifications and adaptations are within the spirit and scope of the present invention, as set forth in following claims.

I claim:

1. A process for producing an aluminum borate ceramic body comprising the steps of:
   (a) calcining substantially dry boric acid-stabilized aluminum acetate powder at a temperature between about 800° C. and about 1600° C. in the presence of oxygen for a time sufficient to convert at least about 80% of the powder to aluminum borate;

(b) forming the calcined powder into a green body; and (c) sintering the green body at a temperature between about 1300° C. and about 1800° C. for a time sufficient to form a sintered aluminum borate ceramic body having a porosity of at least about 40%.

2. The process recited in claim 1, further comprising the step of reducing the particle size of said calcined powder prior to forming said green body.

3. The process recited in claim 4 wherein said reducing step comprises milling said calcined powder in a ball mill.

4. The process recited in claim 1, wherein said forming step comprises pressing said powder into a green body.

5. The process recited in claim 1, wherein at least about 95 weight percent of the calcined powder is aluminum borate.

6. The process recited in claim 1 wherein the sintered ceramic body has a strength of at least about 30 MPa.

7. A process for producing an aluminum borate ceramic body comprising the steps of:

(a) calcining substantially dry boric acid-stabilized aluminum acetate powder at a temperature between about 500° C. and about 1500° C. in the presence of oxygen for a time sufficient to convert at least about 80 percent of the powder to aluminum borate;

(b) reducing the particle size of the calcined powder;

(c) forming the calcined powder into a green body; and (d) sintering the green body at a temperature to form about 1500° C. and about 1700° C. for a time sufficient to form a sintered aluminum borate ceramic body having a porosity greater than about 40 percent.

8. The process recited in claim 1, wherein said sintered aluminum borate ceramic has a porosity of between about 40 percent and about 60 percent.

9. A ceramic body comprising aluminum borate having a porosity of from about 40 percent to about 60 percent, an average pore size of from about 0.5 to about 5 micrometers and a strength of at least about 50 MPa.

10. A ceramic body as recited in claim 9 wherein said ceramic body comprises at least about 80 weight percent $Al_{18}B_4O_{33}$.

11. A filter comprising aluminum borate wherein said aluminum borate has a porosity of at least about 40 percent and an average pore size from about 2 to 3 micrometers.

* * * * *